United States Patent
Afshar

(10) Patent No.: US 7,846,510 B2
(45) Date of Patent: Dec. 7, 2010

(54) METHODS AND COMPOSITIONS FOR FORMING A SPECULAR COATING FILM

(76) Inventor: Amir Afshar, 4132 Loraine Rd., Rancho Palos Verdes, CA (US) 90275

( * ) Notice: Subject to any disclaimer, the term of this patent is extended or adjusted under 35 U.S.C. 154(b) by 1234 days.

(21) Appl. No.: 11/117,812

(22) Filed: Apr. 29, 2005

(65) Prior Publication Data

US 2005/0244584 A1 Nov. 3, 2005

Related U.S. Application Data

(60) Provisional application No. 60/567,867, filed on May 3, 2004.

(51) Int. Cl.
*B05D 5/06* (2006.01)
*B05D 1/38* (2006.01)
*B05D 3/02* (2006.01)
*B05D 7/14* (2006.01)
*B05D 7/16* (2006.01)
*B05D 3/06* (2006.01)

(52) U.S. Cl. .................. 427/419.1; 427/379; 427/380; 427/407.1

(58) Field of Classification Search ............... 427/379, 427/380, 407.1, 419.1
See application file for complete search history.

(56) References Cited

U.S. PATENT DOCUMENTS

| | | | |
|---|---|---|---|
| 4,141,760 A * | 2/1979 | Baldi | 428/556 |
| 5,780,113 A | 7/1998 | Masuda et al. | |
| 5,830,581 A | 11/1998 | Masuda et al. | |
| 6,103,311 A * | 8/2000 | Masuda et al. | 427/407.1 |
| 6,257,732 B1 | 7/2001 | Takahagi et al. | |
| 6,399,152 B1 | 6/2002 | Goodrich | |
| 2005/0238802 A1 * | 10/2005 | Friese et al. | 427/162 |

FOREIGN PATENT DOCUMENTS

EP 0 890 393 A2 * 1/1999

OTHER PUBLICATIONS

Li-Pin Sung et al, Optical Reflectance of Metallic Coatings, *Journal of Coatings Technology*, Sep. 2002, pp. 55-63, vol. 74, No. 932.

* cited by examiner

*Primary Examiner*—William Phillip Fletcher, III

(57) ABSTRACT

A method of making a specular reflective, mirror-like finish on a substrate comprising the steps of applying a one or more layers of a primer coating to the substrate and at least partially curing the primer coating; the following curing of the primer coating; applying an intermediate solution to the previously applied and cured primer coating, the intermediate solution comprising a vacuum metalized pigment in a solvent; further curing the primer coating and the intermediate coating to leave a substantially solvent-free intermediate coating; and applying, a transparent overlay coating to the cured intermediate coating.

24 Claims, 4 Drawing Sheets

METHODS AND COMPOSITIONS FOR FORMING A SPECULAR COATING FILM

This application claims benefit of Provisional Application 60/567,867 filed May 3, 2004.

BACKGROUND OF THE INVENTION

Field of the Invention

Typical liquid coating compositions comprise a mixture of a viscosity-reducing solvent or thinner, which may be either polar, such as water, or non-polar, such as a hydrocarbon, and a film-forming material such as a polymeric binder, both of which may comprise more than one ingredient and optionally a pigment or colorant. As a pigmented liquid composition is applied to a substrate, the film forming material polymerizes to form a coating film. The pigment, which remains dispersed in the film, serves to impart properties to the coating composition such as opacity, color, brightness and aesthetic characteristics. The solvent used in application of a particular coating composition will depend primarily on the binder system and the application. For example, hydrocarbon-based solvents find wide applications with organic (lipophilic) resin/binders while water (hydrophilic) based and/or emulsion-forming resins, such as latex, are used with aqueous solvent systems.

Coating compositions containing metal flake pigments are used to impart a metallic luster to a substrate being coated. Coatings containing aluminum flake pigments are widely used in a variety of applications and fields. For example, such coatings are used on fabrics, plastic, paper, metal, fiberglass and other surfaces where the need for a metallic, silver appearing luster finish is required. Thus it is known that aluminum flake pigments can be incorporated into a variety of binder systems, with or without solvent, to provide protective and decorative finish coatings having aesthetic characteristics such as a silver appearing, metallic luster or bright metallic finish. Reflections off these surfaces may be either specular or diffuse. Reflection off of smooth surfaces such as mirrors or a calm body of water is known as specular reflection. Reflection off of rough surfaces such as clothing, paper, and other uneven surfaces is known as diffuse reflection. Whether the surface is microscopically rough or smooth has a tremendous impact upon the subsequent reflection of a beam of light. It is also known that, coatings within the paint industry have not yet achieved, by comparison, the same mirror like finish that the plating industry has perfected by chrome plating, vacuum metalizing and other types of plating processes.

Aluminum pigments used in coating materials are generally of two types; "leafing" and "non-leafing" as described in U.S. Pat. Nos. 2,858,230, 3,264,129 and 3,389,105.

In the past, the paint industry has attempted to achieve a chrome like appearance on a surface utilizing leafing type aluminum pigments as described in U.S. Pat. Nos. 5,780,113, 5,830,581 and 6,103,311. While use of this methodology can achieve a very bright and reflective metallic look, the aesthetic results do not compare to those achieved in the plating industry by processes such as chrome plating, vacuum metalizing and/or similar plating processes which provide mirror finishes. That is why the coating marketplace has not adopted these types of finishes as replacements for chrome finishes. Another problem associated with using leafing type pigments has been the lack of adhesion between the leafing aluminum and the protective clear topcoat, which is necessary for practical use and marketing purposes.

There have been some recent attempts to create mirror like finish coatings utilizing vacuum metalized type pigments (VMP) in coating formulations. These types of pigments, which have only recently become commercially available, have the brilliance and brightness of vacuum metalized substrates. Even with this degree of brightness, however, the formulation with such pigments has not been successful because of the following: (A) vacuum metalized flakes suspended in a binder will not create a planar or uniform flat surface, therefore disturbing the reflective nature of the vacuum metalized pigments and consequently, the mirror like finish is of poor quality or is not achieved at all with a binder containing material, and (B) for protection, a clear, transparent overlayer is then applied to the mirror like finish surface. In most instances the mirror like finish will no longer exist, because the solvent or solvents present in the clear coat attack the binder in the mirror-like finish and destroy the specular reflectance of that layer.

The present invention provides a unique and novel composition for forming a multi-layer metallic coating that contains little or no polymeric binder. Moreover, the present invention utilizes vacuum metalized aluminum pigments (VMP) in the aforementioned novel composition. The use of binder free compositions which incorporate vacuum metalized pigments is both novel and unique and is not disclosed in any prior art.

SUMMARY

The present invention comprises a novel process and application incorporating vacuum metalized pigment (VMP) coating compositions and the processes for coating various surfaces. Coatings incorporating features of the invention include a multi-layered coating comprised of at least three layers. The first layer, referred to as a primer layer, prepares the surface to be coated. The second layer, referred to as the intermediate layer, sandwiched between the first and last layer, provides the mirror-like or chrome-like reflective finish. The third layer, referred to as the clear overlayer, is a protective clear top coating.

The first layer is a prerequisite for achieving the mirror-like or chrome-like finish. In order to obtain a mirror-like finish, one must begin with a high degree of gloss and smoothness, similar to that of a highly polished automotive finish or a glass surface. Because the beginning surfaces (the substrate prior to coating) may vary in texture, smoothness and gloss, the first layer may consist of one or more coats of the primer material, depending upon the condition of the original surface to be coated. This first layer also serves as a binder for the intermediate coat. Because the intermediate coat may not have a binder, the first coat is prepared in a manner to accept the intermediate coat for adhesion. This is achieved by partially curing the first layer prior to applying the second intermediate layer. Both layers are then fully cured to attain maximum adhesion between the surface being coated, the inter-layer(s) and the overlayer.

The intermediate or second layer consists of vacuum metalized aluminum pigments (VMP), which are dispersed in a solvent or a mixture of solvents, preferably without a binder material. This layer provides the mirror-like reflective finish. The brightness of this layer is generally dependent upon (1) the first layer having a high degree of gloss and glass like smoothness, and (2) the vacuum metalized flakes aligning in a monolayer to reproduce a metalized chrome-like surface.

The third layer is a clear, colorless transparent protective overlayer. This layer is required for the protection of the intermediate layer, because the intermediate layer has very little or no binder. If the metallic mirror-like layer is not protected, it will be exposed to the environment and can rapidly deteriorate. The intermediate layer will also loose its brightness and finish if handled without the protective layer.

DETAILED DESCRIPTION

Figure 1:
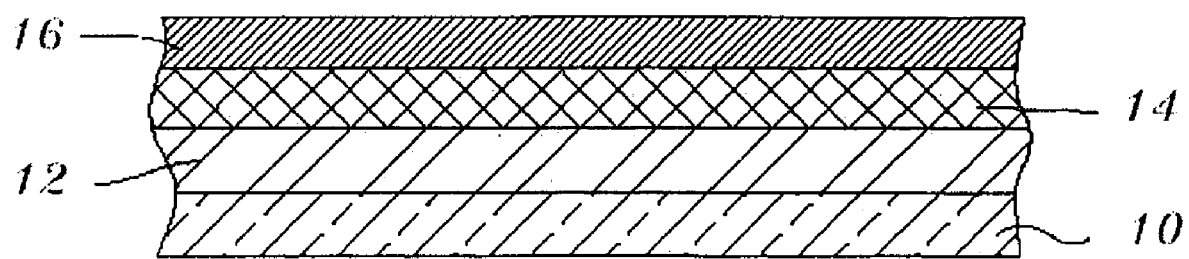
FIG. 1 is a pictorial representation of a receiving surface having a primer coating, a metallic mirror-like film and an overlayer protective coating.

The present invention employs a multi-layer construction and methods for forming highly reflective chrome-like mirror finishes on a substrate. The steps for application of these layers are generally set forth in FIG. 2.

(A) The Primer Solution:

The primer solution comprises one or more cross-linking binder(s), solvent(s) and pigment(s). The binder resin in this solution can be chosen from a variety of commercially available families of cross-linking resins.

Suitable resin families include, but are not limited to (1) heat initiated cross-linking type resins such as the phenolic and/or melamine family; (2) "Isocyanate" cross-linkable resins, such as polyurethane, which are typically catalyzed by a metallic ion such as Tin, and (3) the "Epoxy" family of resins, typically cross-linked by an amine or an amide group. In addition, water-soluble or water reducible versions of the aforementioned resins are commercially available and may be used to provide an aqueous primer solution.

The pigments used in the primer solution may be either organic or inorganic. However, a darker color pigment is preferred such as carbon black, or a combination of carbon black and titanium white to produce a grey color.

Lighter colored pigments such as white or silver are less preferred because they tend to reflect light and this reflection creates an interference with reflection from the "intermediate" layer. As a result, reflection from the intermediate layer may appear to be affected and to be less brilliant.

The choice of a solvent depends on the resin chosen. For example, a combination of aromatic, Ketone and ester solvents can be used with polyurethane.

The use of a surfactant and/or a wetting agent is recommended in order to improve the flow and surface tension in the primer coating. This results in a more defined glass-like finish, which will assist in the improvement of the "intermediate" layer's quality. The choice of a surfactant or a wetting agent is also dependent on the type of system being formulated or used. For example a product such as 3M's Fluorad-FC430, a non-ionic fluoro-surfactant, can be employed when a combination of aromatic ketone and ester solvents are used in conjunction with a polyurethane resin.

Depending upon the binder resin type, a single or dual-component system may be formulated. For example, a system using a phenolic base or melamine containing binder will produce a single component system.

Formulations that are sprayable in powder form (powder coatings) are another example of a single component system. A single component system allows the formulator to package the catalyst and all the cross-linking and non-cross-linking components of the formula in a single container without sacrificing the shelf life of the solution. Usually, single component coatings require heat or ultra-violet light for cross-linking. By comparison, a two-component system will cure and/or cross-link when the separately packaged components are mixed together to form a coating. Such coatings can be formulated as two component "polyurethane" or "epoxy" coatings. By way of example, a polyurethane formulation containing acrylic or polyester polyols can be packaged in a first container and an isocyanate cross linker resin in a second container. This constitutes a two component polyurethane kit, which is standard in the coatings industry.

One of the advantages to cross-linking the primer layer is to provide chemical resistance, which is necessary for the application of the next or "intermediate" layer. Another advantage to cross-linking the primer layer is increased adhesion that is provided to the receiving-surface as well as to the intermediate layer that is next applied.

The formulation of Examples 1, 2 and 3 provide various solutions which may be used for practicing the invention as well as the preferred process steps to produce a desirable metallic mirror surface on a receiving surface substrate or article.

Prior to applying the primer solution, the receiving surface should be clean and free of dirt and grease for optimal results. Once a suitable primer composition is chosen, the solution may be applied to the receiving surface by using a HVLP, electrostatic or conventional spray gun. The thickness of the dried film layer is preferably from about one to about two mils.

Once the primer solution is applied, the coated substrate is at least partially cured. The type of resin system selected determines the curing method, curing time and temperature. For example, a typical phenolic resin formulation requires a minimum temperature of about 250° F. for a period of 20 minutes to provide the minimum curing required for passing a solvent resistance test. This time and temperature will usually not provide a full cure. However, this will allow a partial cure to be obtained while still being sufficient to pass the solvent resistance test. This solvent resistance test consists of five (5) rubs of methyl ethyl ketone ("M.E.K. RUBS") on the primer layer. The M.E.K. rub test is a standard in the coatings industry for testing solvent resistances on coated surfaces. The reason for the M.E.K. being the solvent of choice is that it is one of the strongest solvents available to the industry. In order to conduct the M.E.K. test, one should begin with a cloth soaked in M.E.K., followed by rubbing the surface with mild pressure as if one were cleaning a surface. The greater number of rubs conducted, the higher the degree of solvent resistance. There is no standard for the number of M.E.K. rubs required. For the process set forth herein it has been found that if the primer coat passes the five M.E.K. rub test, it has adequate solvent resistance to proceed to the application of the next layer. To pass this test the primer coat tested should not exhibit a change in gloss or film hardness after a given number of rubs are applied. Passing this test ensures that the application of the next layer will not affect or destroy the primer layer. One reason for this test is that the "intermediate" layer solution next applied contains a high concentration of solvents. The full curing of the primer layer at this stage is not desired because, if a full cure of this layer is obtained adequate adhesion to the "intermediate" layer may not result. Once the primer layer has passed the solvent test, this layer is ready to receive the "intermediate" layer. Multiple first layers may be applied as desired to obtain maximum cosmetic quality.

(B) The Intermediate Layer Solution:

The intermediate solution is comprised of vacuum metalized pigments and solvent(s). Vacuum metalized pigments may be manufactured from a variety of pigment materials such as mica, aluminum flakes or a synthetic pigment material that can then be vacuum metalized. The preferred pigment is a vacuum metalized aluminum, such as a non-leafing vacuum metalized aluminum flake. By way of example, a vacuum metalized aluminum pigment designated as Starbrite 2100, or 4102 EAC Aluminum Dispersion, supplied by Silberline Manufacturing of Pennsylvania has been found to be suitable for the process described herein. In Examples 1, 2 & 3 the amount of vacuum metalized aluminum pigment solution or paste in the total formulation is 23 to 30 grams per liter.

Solvents with evaporation rate greater than about 4.0 and less than about 8.5, (where N-Butyl acetate=1) are preferred over solvents with a lower evaporation rate for delivery of the intermediate layer solution. Solvents with higher evaporation rates assist in the formation of a uniform monolayer film. Solvent drips or runs in the spray application of the intermediate layer can be avoided when a higher rate evaporating solvent is used. Some examples of suitable solvents are methyl ethyl ketone, acetone, methyl acetate, or a combination of these solvents.

The solution can be applied by spray or dip application. For spray applications a conventional or HVLP spray gun is recommended. A standard spray gun, such as the type MBC spray gun made by the deVilbiss company may be employed. When using a spray gun, it is suggested to have the air pressure level at about 15 to 25 psi and a lower fluid volume setting. In a preferred method, the gun is held perpendicular to the surface and approximately 6 to 10 inches from the surface, three alternate, overlapping right to left passes are sprayed. These settings and spray methods result in a thin, monolayer dry film. As the solvent evaporates a specular reflective (mirror like) brilliant surface will appear.

If a semi-transparent film with poor hiding is produced, the fluid volume setting should be increased to provide a slightly higher output. Alternatively, the number of passes can be increased to achieve the optimal hiding or coverage desired.

If the results show poor reflectance and brilliance the cause is usually over spraying. This effect will hinder the formation of the monolayer film. It is therefore suggested that the fluid volume control should be adjusted to a lower setting. Alternatively, the number of passes should be reduced to achieve optimal brilliance and reflectance. Following application of the intermediate layer, the layers are further cured.

(C) The Transparent Overlayer Solution.

A number of clear polymeric type resins may be employed to form the final layer. Preferably, the polymers should not discolor and should also maintain their clarity over time. Clarity is determined by the refractive index of the material; the higher the refractive index value, the greater the amount of clarity and subsequently the greater the amount of light transmission. This clarity factor assists greatly in the light reflectance from the intermediate layer. Depending upon the requirements, resins for use in this layer may be of a crosslinking or a non-crosslinking type. Cross-linking resins are preferred when a solvent resistance or other physical properties such as a certain degree of hardness and scratch resistance are desired. Some of the preferred cross-linking resins are acrylic polyols, polyester polyols, polyester resins, resins sprayable in powder form and UV curable resins. In addition some of the preferred non-cross-linking resins are solvent and water reducible acrylic resins, nitrocellulose lacquers and polyvinyl resins. For optimum reflectance a high degree (94%) of gloss in the overlayer is recommended.

For achieving colored finishes the overlayer solution may optionally be tinted adding a small amount of a pigment(s) or a dye(s) to the overlayer solution.

The solution can be applied by spray or dip application. For spray applications a conventional or HVLP spray gun is recommended. The curing of the overlayer is dependent upon the choice of the polymeric resin system. For example a melamine cross-linkable resin, or powder sprayable system will require heating at 250° F. to 350° F. depending on the formulation. Alternatively, a dual component polyurethane system does not necessarily require heat to cure; however, one can apply heat to accelerate the cure cycle. The same would apply to air-dry resins such as acrylics or nitrocellulose lacquers.

Figure 2:
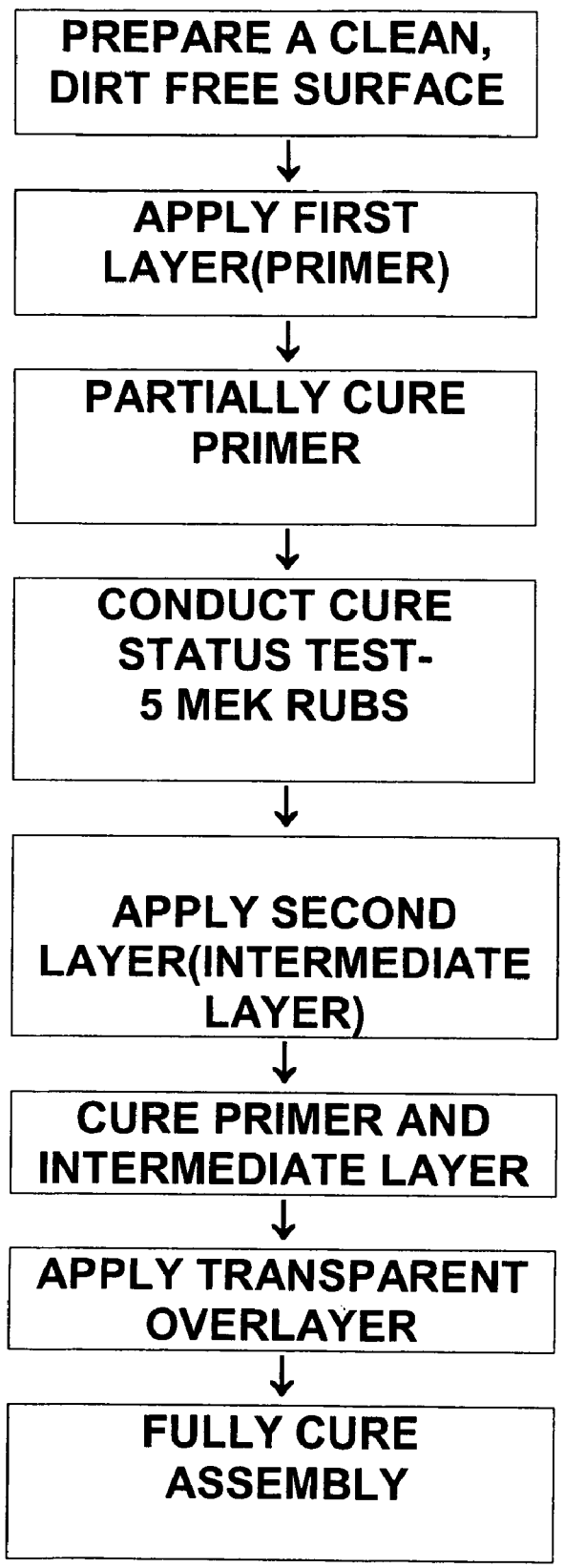
FIG. 2 is a block diagram showing the steps of the methods, process and the formation of an article using the teachings of the present invention.
Figure 3:
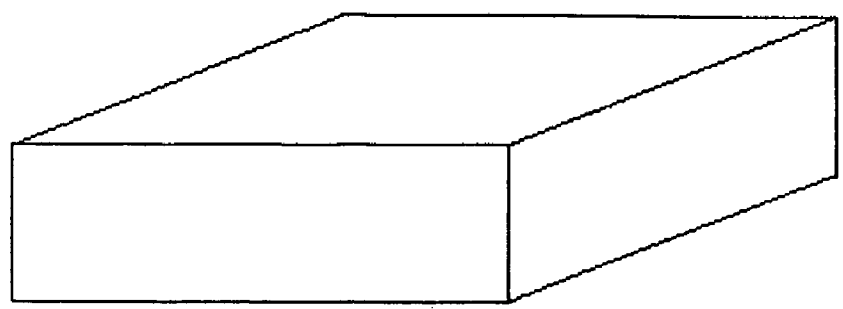
FIG. 3 is a pictorial representation of an article, having a metallic mirror like surface and a colored metallic luster on at least a portion thereof formed using the teachings of the present invention.
Figure 4:
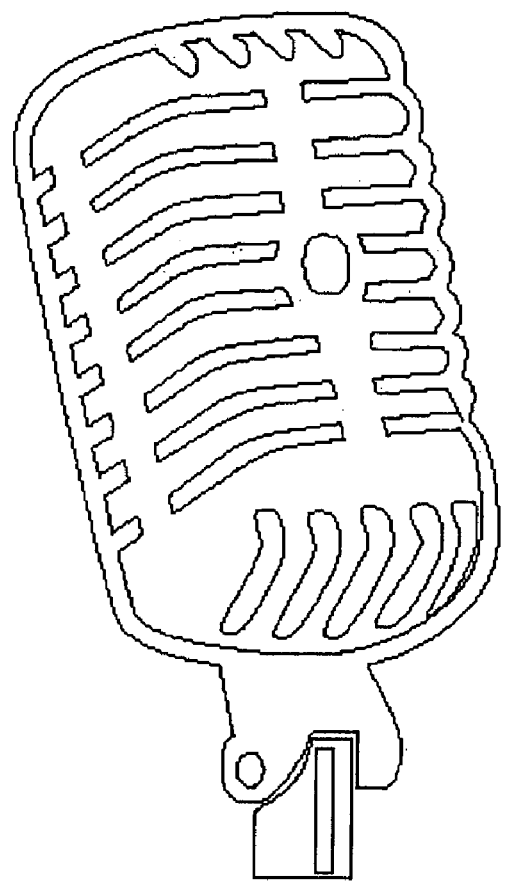
FIG. 4 is a pictorial representation of a substrate having metallic mirror like surface formed thereon using the teachings of the present invention.
Figure 5:
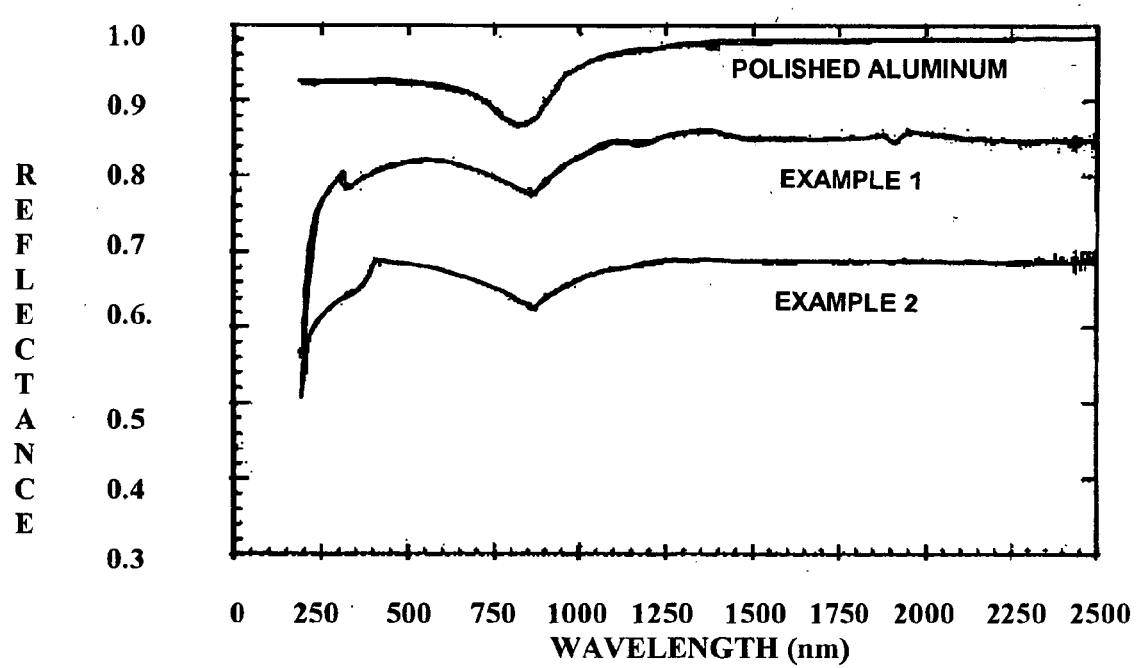
FIG. 5 is a graph comparing the reflectivity of coatings incorporating the invention herein with a polished aluminum surface.

Referring to FIGS. 1 and 2, an object coated according to the teaching herein has a receiving surface or substrate 10, which may be the surface of any article. A three layer metallic mirror surface on the substrate 10 comprises a primer coat 12, an intermediate layer 14, and an overlayer 16 formed thereon using the method, process solutions and teachings of the present invention. Examples 1, 2 and 3, set forth suitable compositions and procedures for preparing highly reflective surfaces. FIG. 5 compares the reflectance thereof to the reflectance of a high polished aluminum surface.

Example 1

TABLE 1

The Primer Solution

| No. | Material | Description | Weight - Grams | Supplier |
|---|---|---|---|---|
| 1 | BLS 2700 | Phenolic Resin | 1812.0 | Georga Pacific |
| 2 | Ethanol | Solvent | 1500.0 | Ashland Chemical Co. |
| 3 | MEK | Solvent | 456.0 | Ashland Chemical Co. |
| 4 | Disperbyk | Dispersing Agent | 6.0 | BYK Chemie |
| 5 | Raven 450 | Black pigment | 200.0 | Columbia Chemical Co. |
| 6 | Flourad FC430 | Surfactant | 0.10 | 3M |
| 7 | Ethanol | Solvent | 1671.0 | Ashland Chemical Co. |
| 8 | MEK | Solvent | 450.0 | Ashland Chemical Co. |
| 9 | N.Butyl Alcohol | Solvent | 400.0 | Ashland Chemical Co. |

TABLE 2

The Intermediate Solution

| No. | Material | Description | Weight - Grams | Supplier |
|---|---|---|---|---|
| 1 | Starbrite 2100 | Aluminum VMP | 24.0 | Silberline Manufacturing |
| 2 | MEK | Solvent | 690.0 | Ashland Chemical Co. |
| 3 | N.Butyl Acetate | Solvent | 60.0 | Ashland Chemical Co. |

TABLE 3

The Overlayer Solution

| No. | Material | Description | Volume in ML | Supplier |
|---|---|---|---|---|
| 1 | Clear U-8800 | Polyurethane Component A | 90.0 | TransChem Coatings L.A. |
| 2 | TC Catalyst-U | Isocyanate Cross-linker Component B | 30.0 | TransChem Coating L.A. |

Production of primer solution—A phenolic resin is used for the primer. This resin is formulated according to Table 1 where components 1-5 where mixed together using a one-horse power mixer with a four-inch diameter dispersion blade to obtain good dispersion. The resultant solution was then placed in a five-gallon ball mill containing ¼" diameter steel balls. The carbon black pigment needs milling to reduce the pigment to a smaller particle size. Accordingly, it is recommended that the solution be milled for a minimum of twenty-four hours. Once this milling cycle is finished the result is a homogeneous black solution with a particle size of 10 microns or smaller. After this process components 6 thru 9 of Table 1 were added and mixed using the same mixer.

Production of the intermediate solution—The VMP pigment used was Starbrite 2100, which is manufactured by Silberline. Table 2 specifies the pigment to solvent mix ratio. In this step the solvents are added to the pigment under a very gentile mixing and mixed for about 5 minutes.

Overlayer solution—Numerous pre-manufactured transparent clear coatings for use as the over layer solution are commercially available. The two-part product manufactured by TransChem coating of Los Angeles was mixed with stirring.

Applying the primer solution—A four by six inch steel panel with a smooth finish as the receiving surface was selected. The panel was wiped with a clean rag, and acetone to insure a clean, grease free receiving surface. The solution set forth in Table 1 and prepared as set forth above was then applied to the cleaned surface with a conventional spray gun to produce a wet coating thickness of approximately two mils. The solvents were allowed to flash out for a period of ten minutes. The panel was then placed in an oven at 250° F., for a period of twenty minutes. This allowed partial curing (cross-linking) of the primer layer. After cooling the panel had a black surface with a very high gloss, glass-like surface. The panel was tested with 5 MEK rubs. The surface coating showed no change in gloss but a slight softening of the layer.

Applying the intermediate solution—The intermediate solution set forth in Table 2 was applied to the primer coated panel using an MBC spray gun made by the deVilbiss company. The air pressure level on the spray gun was set to 20 psi and a lower fluid volume setting was applied. The spray gun was held perpendicular to the surface and approximately 6 inches from the surface and three alternate, overlapping coatings of the intermediate solution were applied in right to left passes. These settings and spray methods resulted in a thin, monolayer dry film. As the solvents evaporated a specular reflective (mirror like), brilliant surface appeared. The test panel was then placed inside an oven and cured at 300° F. for a period of thirty minutes. This process fused the intermediate layer with the primer layer and further cured the primer layer.

Applying the overlayer solution—The overlayer solution was prepared and mixed according to Table 3 above and was applied to the cured intermediate layer on the test panel with an MBC spray gun using 40 psi and a medium fluid volume setting. The wet film thickness was about two mils. While the clear overlayer would have cross-linked and cured over a period of time, without assistance or acceleration, to accelerate the cure period, the test panel was placed inside an oven at 200° F. for a period of fifteen minutes, at which point it was fully cured.

The test panel surface viewed under normal illumination appeared uniform across changes in the background against which they were viewed and had a "specular" (mirror) reflectance. The reflectance of this surface over a range of wavelengths, as cussed below, is shown by the middle curve in FIG. 5.

Example 2

TABLE 4

Component A for the Primer Solution

| No. | Material | Description | Weight - Grams | Supplier |
|---|---|---|---|---|
| 1 | DER 671X75 | Epoxy Resin | 1600.0 | Dow Chemicals |
| 2 | MEK | Solvent | 140.0 | Ashland Chemical Co. |
| 3 | N.Butyl Alcohol | Solvent | 100.0 | Ashland Chemical Co. |
| 4 | Xylene | Solvent | 100.0 | Ashland Chemical Co. |
| 5 | Tioxide | White Pigment | 1250.0 | Huntsman |
| 6 | Flourad FC430 | Surfactant | 0.08 | 3M |
| 7 | EP17038 | Black Epoxy Paste | 100.0 | TransChem Coatings L.A. |

TABLE 5

Component B for the Primer Solution

| No. | Material | Description | Weight - Grams | Supplier |
|---|---|---|---|---|
| 1 | DER 671X75 | Epoxy Resin | 8.0 | Dow Chemicals |
| 2 | MEK | Solvent | 10.0 | Ashland Chemical Co. |

TABLE 5-continued

Component B for the Primer Solution

| No. | Material | Description | Weight - Grams | Supplier |
| --- | --- | --- | --- | --- |
| 3 | N.Butyl Alcohol | Solvent | 4.0 | Ashland Chemical Co. |
| 4 | Xylene | Solvent | 11.0 | Ashland Chemical Co. |
| 5 | Diethylene Amine | Amine | 1500.0 | Columbia Chemical Co. |
| 6 | Epicure 3125 | Polyamide | 5.0 | Shell |

TABLE 6

The Intermediate Solution

| No. | Material | Description | Weight - Grams | Supplier |
| --- | --- | --- | --- | --- |
| 1 | Metasheen 1803 | Aluminum VMP | 24.0 | Wolstenhome Intl. LTD |
| 2 | Acetone | Solvent | 400.0 | Ashland Chemical Co. |
| 3 | Ethyl Acetate | Solvent | 350.0 | Ashland Chemical Co. |

TABLE 7

The Overlayer Solution

| No. | Material | Description | Weight - Grams | Supplier |
| --- | --- | --- | --- | --- |
| 1 | Paraloyd B66 | Acrylic Resin | 400.0 | Robin & Haas |
| 2 | MEK | Solvent | 200.0 | Ashland Chemical Co. |
| 3 | Ethyl Acetate | Solvent | 200.0 | Ashland Chemical Co. |
| 4 | N-Butyl Acetate | Solvent | 250.0 | Ashland Chemical Co. |
| 5 | BYK 341 | Wetting Agent | 1.0 | BYK Chemie |

Production of primer solution—Components 1-6 set forth in Table 4 were mixed together for 15 minutes using a one-horse power mixer with a four-inch diameter dispersion blade. The resultant solution was then placed in a five-gallon ball mill and milled using ¼" diameter steel ball media to reduce the white titanium dioxide pigment to a smaller particle size. A minimum of twenty-four hours of milling the solution is recommended. The result of the milling process was a homogeneous white solution with a particle size of 10 micron or smaller. After milling the black epoxy based paste was added to the milled white solution for adjustment to a dark gray tone. To prepare component B of the primer solution component 1 through 4 of Table 5 were well mixed and heated to 145° F., components 5 and 6 were added slowly, while the solution was being mixed.

Production of the intermediate solution—Aluminum VMP (Metasheen 1803) manufactured by Wolstenhome, was mixed with the solvents set forth in Table 6 under very gentle mixing conditions.

Overlayer solution—A clear acrylic lacquer was formulated as set forth in Table 7, using resin supplied by Rohm & Haas, the components being mixed for 25-60 minutes.

Applying the primer solution—A four by six inch steel panel with a smooth finish was selected as the substrate. The panel was wiped with acetone using a clean rag, to insure a clean, grease free receiving surface. The component A solution (Table 4) was mixed with the Component B solution (Table 5) with a mix ratio of 3:1 by volume. It was then applied to the substrate with a conventional spray gun to produce a wet coating thickness of approximately 2.5 mils. The panel was allowed to cure for a period of approximately twenty-four hours at room temperature (70° F.) to provide a partial curing (cross-linking) of the primer layer. The coated panel had a gray surface with a very high gloss and a glass like appearance. The 5 MEK rub test showed no change in the gloss, with only a slight softening of the layer.

Applying the intermediate solution—The intermediate solution set forth in Table 6 was applied to the primed test panel immediately after the twenty-four hour partial curing cycle using a deVilbiss MBC spray gun. The air pressure level on the spray gun was set to 20 psi and a lower fluid volume setting was applied. The spray gun was held perpendicular to the surface approximately 6 inches from the surface and three alternate, overlapping right to left passes were applied. These settings and spray methods resulted in a thin, monolayer dry film. As the solvents evaporated a specular reflective (mirror like), brilliant surface appeared. The test panel was held at room temperature for a period of approximately 100 hours to insure that the intermediate layer fused with the primer layer and the assembly fully cured.

Applying the overlayer solution—The overlayer solution was prepared using the components set forth in Table 7 and was applied to the test panel with a MBC spray gun using 40 psi and a medium fluid volume setting. The wet film thickness was about 2.5 mils. The overlayer was allowed to cure at ambient temperature.

The coated test panel when viewed under real-world illumination appeared uniform across changes in the background against which it was viewed and had a "specular" (mirror) reflectance. The reflectance of the surface produced in the composition and procedure of Example 2 is shown as the lower curve in FIG. 5 compared to a polished aluminum surface and the surface of FIG. 1.

Example 3

All the steps in Example 2 were repeated, except for the curing cycles. The primer layer was partially cured at 180° F. for a period of 10 minutes. This was followed by a MEK rub test, which resulted in no change in gloss, but some softening of the layer. The intermediate layer was then applied and cured at 200° F. for a period of 20 minutes, followed by the application of the overlayer, which was allowed to flash for approximately 10 minutes. The test panel was then placed in an oven and cured at 200° F. for 15 minutes. The appearance and reflectance of the test panel prepared by this modified procedure was identical to the test panel in Example 2.

The samples were measured using a Perkin-Elmer Lambda 900 dual beam spectrophotometer over a spectral range from 190 nm to 2500 nm wavelength at 1 nm intervals using unpolarized light. The reflection [R] measurements are made at near normal incidence (8°), with the samples mounted directly onto the integrating sphere detector. The 8° configuration was specifically chosen to measuring specular reflection, but since the sample is mounted onto the integrating sphere detector, non-specular or diffuse contribution to reflectance is also captured. Thus, the reflectance [R] data obtained represented the total reflectance, including both specular and diffuse reflection components. Since the measurements were made relative to an Al first surface mirror, they were corrected for the response of this reference using a NIST certified spectral reflectance standard (SRM 2023).

Thus, the [R] values set forth in FIG. 5 are absolute reflectance values. The dip in [R] seen in both samples centered around 835 nm is characteristic of Al.

FIG. 5 shows the results for Examples 1 and 2, along with a reference trace for pure polished Al obtained from handbook data as set forth in the art. Highly polished aluminum and aluminum backed mirrors have a reflectance of about 95-98%. However, the reflectance of typical polished aluminum is 85-90%. For comparison, prior art commercial, reflective or glossy paint coatings have a much lower reflectance, typically around 50-70%. Polished stainless has a reflectance of about 60%. Examples 1-3 produce surfaces with a reflectance of about 70-85% which is significantly superior to that obtained using prior coatings and coating techniques.

What I claim is:

1. A method of preparing a specular reflective coating on a substrate comprising:
    a) applying a one or more layers of a primer coating to the substrate and at least partially curing the primer coating,
    b) following the at least partially curing of said primer coating, applying an intermediate solution to the previously applied and at least partially cured primer coating, the intermediate solution comprising a vacuum metalized pigment in a solvent, the intermediate solution being binder-free,
    c) further curing the at least partially cured primer coating and the intermediate coating to leave a solvent-free intermediate coating, and
    d) applying a transparent overlay coating to the cured intermediate coating.

2. The method of claim 1 further including curing of the coated substrate after application of the transparent overlay coating.

3. The method of claim 1 wherein the primer coating comprises a crosslinking binder, a solvent and pigments.

4. The method of claim 3 wherein the crosslinking binder is a resin selected from the group consisting of:
    a) heat initiated cross-linking phenolic or melamine resins
    b) cross-linkable isocyanate resins, and
    c) epoxy resins, and water-soluble or water reducible versions of said resins.

5. The method of claim 4 wherein the cross-linkable isocyanate resin is a polyurethane which may also include a metallic ion catalyst and the epoxy resins is crosslinkable by an amine or an amide group.

6. The method of claim 3 wherein the pigment is black or grey in color.

7. The method of claim 3 wherein the pigment comprises carbon black or carbon black blended with titanium white.

8. The method of claim 3 wherein the primer coating further contains a wetting agent, a surfactant or a combination thereof.

9. The method of claim 3 wherein the acceptability of the at least partially cured primer coating for application of the intermediate coating is determined by a solvent wipe test using a minimum of five wipes of methyl ethyl ketone.

10. The method of claim 1 wherein the intermediate solution consists essentially of a vacuum metalized pigment in a solvent having a evaporation rate greater than about 4.0 and less than about 8.5.

11. The method of claim 1 wherein the solvent in the intermediate solution comprises methyl ethyl ketone, acetone, methyl acetate, N-butyl alcohol, ethyl acetate or a combination thereof.

12. The method of claim 1 wherein the transparent overlay coating comprises a clear polymeric resin.

13. The method of claim 12 wherein the clear polymeric resin is a crosslinkable resin.

14. The method of claim 12 wherein the clear polymeric resin is selected from the group consisting of crosslinkable acrylic polyols, polyester polyols, polyester resins, resins sprayable in powder form and UV curable resins and non-cross-linking solvent and water reducible acrylic resins, nitrocellulose lacquers and polyvinyl resins.

15. The method of claim 12 wherein the transparent overlay coating additionally includes pigments or dyes.

16. The method of claim 1 wherein:
    a) the primer coating comprises a two part mixture comprising, in a first part, an epoxy resin, a white pigment and a black epoxy paste, a surfactant and a solvent comprising a combination of methyl ethyl ketone, xylene and N-butyl alcohol, and, in a second part, an epoxy resin, an amine and a polyamide crosslinking agent, and a solvent comprising a combination of methyl ethyl ketone, xylene and N-butyl alcohol,
    b) the intermediate solution comprises non-leafing metalized aluminum, acetone and ethyl acetate, and
    c) the transparent overlay coating comprises an acrylic resin, a wetting agent, an isocyanate crosslinker, and a solvent comprising a combination of methyl ethyl ketone, ethyl acetate and N-butyl acetate.

17. The method of claim 16 wherein the solvent in the primer coating is evaporated and the primer coating is cured for at least about 10 minutes at about 180° F., after application of the intermediate solution the solvent in the intermediate solution is evaporated and the primer coating and intermediate solution is cured for about at least an additional 20 minutes at about 200° F. and, after application of the overlay coating the overlay coating is cured for about at least an additional 15 minutes at about 200° F.

18. A method of preparing a specular reflective coating on a substrate comprising:
    a) applying a one or more layers of a primer coating to the substrate and at least partially curing the primer coating,
    b) applying an intermediate solution to the previously applied primer coating, the intermediate solution comprising a vacuum metalized pigment in a solvent, the intermediate solution being binder-free and the vacuum metalized pigment being a non-leafing vacuum metalized aluminum;
    c) further curing the at least partially cured primer coating and the intermediate coating to leave a solvent-free intermediate coating, and
    d) applying a transparent overlay coating to the cured intermediate coating.

19. A method of preparing a specular reflective coating on a substrate comprising:
    a) applying a one or more layers of a primer coating to the substrate and at least partially curing the primer coating, said primer coating comprising a phenolic resin, a dispersant, a black pigment, a surfactant and a solvent comprising a combination of ethanol, methyl ethyl ketone, and N-butyl alcohol;
    b) applying an intermediate solution to the previously applied primer coating, the intermediate solution comprising a non-leafing vacuum metalized aluminum pigment in a solvent, the intermediate solution being binder-free and comprising methyl ethyl ketone and N-butyl alcohol;
    c) further curing the at least partially cured primer coating and the intermediate coating to leave a solvent-free intermediate coating, and d) applying a transparent overlay coating to the cured intermediate coating, said transparent overlay coating comprising a polyurethane resin and an isocyanete crosslinker.

20. The method of claim 19 wherein the solvent in the primer coating is evaporated and the primer coating is cured for at least about 20 minutes at about 250° F., after application of the intermediate solution the solvent in the intermediate solution is evaporated and the primer coating and intermediate solution is cured for about at least an additional 30 minutes at 300° F. and, after application of the overlay coating, the overlay coating is allowed to crosslink and cure.

21. The method of claim 19 wherein the crosslinking and curing of the overlay coating is accelerated by heating for at least about 15 minutes at about 200° F.

22. A method of preparing a specular reflective coating on a substrate comprising:
   a) applying a one or more layers of a primer coating to the substrate and at least partially curing the primer coating, said primer coating comprising a two part mixture comprising, in a first part, an epoxy resin, a white pigment and a black epoxy paste, a surfactant and a solvent comprising a combination of methyl ethyl ketone, xylene and N-butyl alcohol, and, in a second part, an epoxy resin, an amine and a polyamide crosslinking agent, and a solvent comprising a combination of methyl ethyl ketone, xylene and N-butyl alcohol,
   b) applying an intermediate solution to the previously applied primer coating, the intermediate solution comprising a non-leafing vacuum metalized aluminum pigment in a solvent, the intermediate solution being binder-free and comprising acetone and ethyl acetate;
   c) further curing the at least partially cured primer coating and the intermediate coating to leave a solvent-free intermediate coating, and
   d) applying a transparent overlay coating to the cured intermediate coating, said transparent overlay coating comprising an acrylic resin, a wetting agent, an isocyanate crosslinker, and a solvent comprising a combination of methyl ethyl ketone, ethyl acetate and N-butyl acetate.

23. The method of claim 22 wherein the solvent in the primer coating is evaporated and the primer coating is cured for at least about 24 hours at about 70° F., after application of the intermediate solution the solvent in the intermediate solution is evaporated and the primer coating and intermediate solution is cured for about at least an additional 100 hours at about 70° F. and, after application of the overlay coating, the overlay coating is allowed to cure.

24. The method of claim 22 wherein the solvent in the primer coating is evaporated and the primer coating is cured for at least about 10 minutes at about 180° F., after application of the intermediate solution the solvent in the intermediate solution is evaporated and the primer coating and intermediate solution is cured for about at least an additional 20 minutes at about 200° F. and, after application of the overlay coating, the overlay coating is cured for about at least an additional 15 minutes at about 200° F.

* * * * *